US012755897B2

(12) United States Patent
Chen

(10) Patent No.: US 12,755,897 B2
(45) Date of Patent: Oct. 6, 2026

(54) ISOLATION TRANSFORMER

(71) Applicants: INVENTEC (PUDONG) TECHNOLOGY CORPORATION, Shanghai (CN); INVENTEC CORPORATION, Taipei City (TW)

(72) Inventor: Houjian Chen, Shanghai (CN)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 716 days.

(21) Appl. No.: 18/209,802

(22) Filed: Jun. 14, 2023

(65) Prior Publication Data

US 2024/0404748 A1 Dec. 5, 2024

(30) Foreign Application Priority Data

Jun. 2, 2023 (CN) ......................... 202310652990.6

(51) Int. Cl.
*H01F 27/42* (2006.01)
*H01F 27/28* (2006.01)

(52) U.S. Cl.
CPC ............. *H01F 27/42* (2013.01); *H01F 27/28* (2013.01)

(58) Field of Classification Search
CPC ................................. H01F 27/42; H01F 27/28
See application file for complete search history.

(56) References Cited

U.S. PATENT DOCUMENTS

2012/0249257 A1* 10/2012 Takahashi ................ H03H 1/02 333/172
2016/0308683 A1* 10/2016 Pischl ..................... H04L 12/10
2016/0351327 A1* 12/2016 Shigematsu .......... H01F 27/292
2020/0313724 A1* 10/2020 Mashita ............... H03H 7/0138
2021/0352376 A1* 11/2021 Huang ............... H04N 21/6118
2022/0208443 A1* 6/2022 Kim ...................... H01F 27/427
2023/0119130 A1* 4/2023 Watanabe ............... H04L 25/02 341/150

* cited by examiner

*Primary Examiner* — Malcolm Barnes
(74) *Attorney, Agent, or Firm* — Maschoff Brennan

(57) ABSTRACT

An isolation transformer includes a common mode choke, a first capacitor, a second capacitor, a first resistor, a second resistor, a third resistor, and a third capacitor. Each of the first capacitor and the second capacitor is connected to the common mode choke through an end. Each of the first resistor and the second resistor is connected to another end of the second capacitor through an end. The third resistor is connected to another end of the first resistor and another end of the second resistor through an end, and connected to the reference potential point through another end. The third capacitor is connected to another end of the first resistor and another end of the second resistor through an end, and connected to the reference potential point through another end. A power consumption of each of the first resistor and the second resistor is greater than 0.4 watt.

9 Claims, 2 Drawing Sheets

ISOLATION TRANSFORMER

CROSS-REFERENCE TO RELATED APPLICATIONS

This non-provisional application claims priority under 35 U.S.C. § 119 (a) on Patent Application No(s). 202310652990.6 filed in China on Jun. 2, 2023, the entire contents of which are hereby incorporated by reference.

BACKGROUND

1. Technical Field

This disclosure relates to an isolation transformer, specifically relates to an isolation transformer applicable to automotive Ethernet.

2. Related Art

Automotive Ethernet is a new type of local area network technology for connecting different electrical devices in a car. Conventional local area network uses four pairs of unshielded twisted pair cables, while the automotive Ethernet may achieve high speed data transmission with one pair of unshielded twisted pair cables.

SUMMARY

Accordingly, this disclosure provides an isolation transformer which is applicable to automotive Ethernet.

An isolation transformer according to an embodiment of this disclosure comprises a common mode choke, a first capacitor, a second capacitor, a first resistor, a second resistor, a third resistor, and a third capacitor. The first capacitor is electrically connected to the common mode choke through an end. The second capacitor is electrically connected to the common mode choke through an end. The first resistor is electrically connected to another end of the first capacitor through an end. The second resistor is electrically connected to another end of the second capacitor through an end. The third resistor is electrically connected to another end of the first resistor and another end of the second resistor through an end, and is connected to a reference potential point through another end. The third capacitor is electrically connected to the other end of the first resistor and the other end of the second resistor through an end, and is connected to the reference potential point through another end. A power consumption of each of the first resistor and the second resistor is greater than 0.4 watt.

In view of the above description, the isolation transformer of the present disclosure may realize high speed data transmission with less transmission cables.

The above description of the present disclosure and the following description of the embodiments are provided to illustrate and explain the spirit and principles of the present invention, and to further clarify the scope of the patent claims for the present invention.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
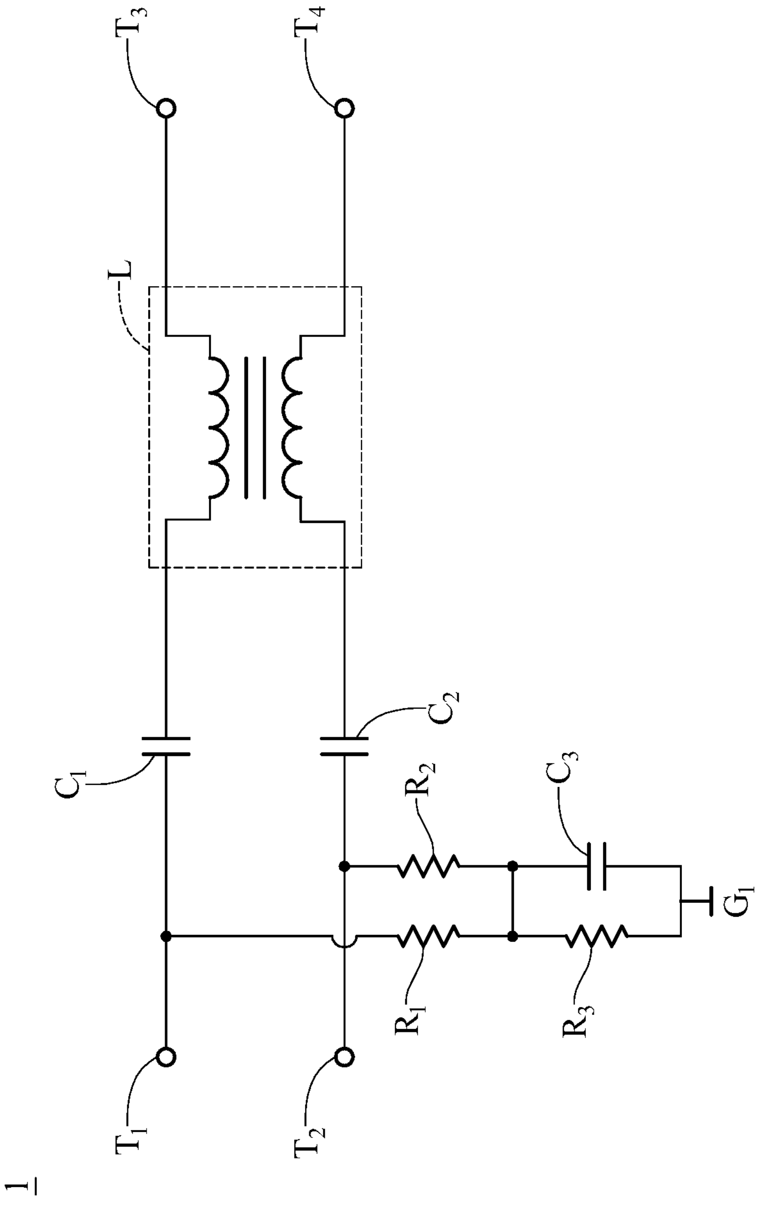
FIG. 1 is a circuit diagram illustrating an isolation transformer according to an embodiment of the present disclosure.

Please refer to FIG. 1 which is a circuit diagram illustrating an isolation transformer according to an embodiment of the present disclosure.

As shown in FIG. 1, an isolation transformer 1 according to an embodiment of the present disclosure includes a common mode choke L, a first capacitor $C_1$, a second capacitor $C_2$, a first resistor $R_1$, a second resistor $R_2$, a third resistor $R_3$ and a third capacitor $C_3$. The first capacitor $C_1$ is electrically connected to the common mode choke L through an end. The second capacitor $C_2$ is electrically connected to the common mode choke L through an end. The first resistor $R_1$ is electrically connected to another end of the first capacitor $C_1$ through an end. The second resistor $R_2$ is electrically connected to another end of the second capacitor $C_2$ through an end. The third resistor $R_3$ is electrically connected to another end of the first resistor $R_1$ and another end of the second resistor $R_2$ through an end, and is connected to a first reference potential point $G_1$ through another end. The third capacitor $C_3$ is electrically connected to the other end of the first resistor $R_1$ and the other end of the second resistor $R_2$ through an end, and is connected to the first reference potential point $G_1$ through another end. A power consumption of each of the first resistor $R_1$ and the second resistor $R_2$ is greater than 0.4 watt.

Specifically, in one implementation of the isolation transformer 1 shown in FIG. 1, the capacitance of each of the first capacitor $C_1$ and the second capacitor $C_2$ may be 100 nanofarad. The resistance of each of the first resistor $R_1$ and the second resistor $R_2$ may be 1000 ohm. The resistance of the third resistor $R_3$ may be 100000 ohm. The capacitance of the third capacitor $C_3$ may be 4.7 nanofarad. The terminal $T_1$ and terminal $T_2$ of the isolation transformer 1 may be connected to a physical layer through a medium dependent interface (MDI). The terminal $T_3$ and terminal $T_4$ may be connected to a RJ-45 connector.

Figure 2:
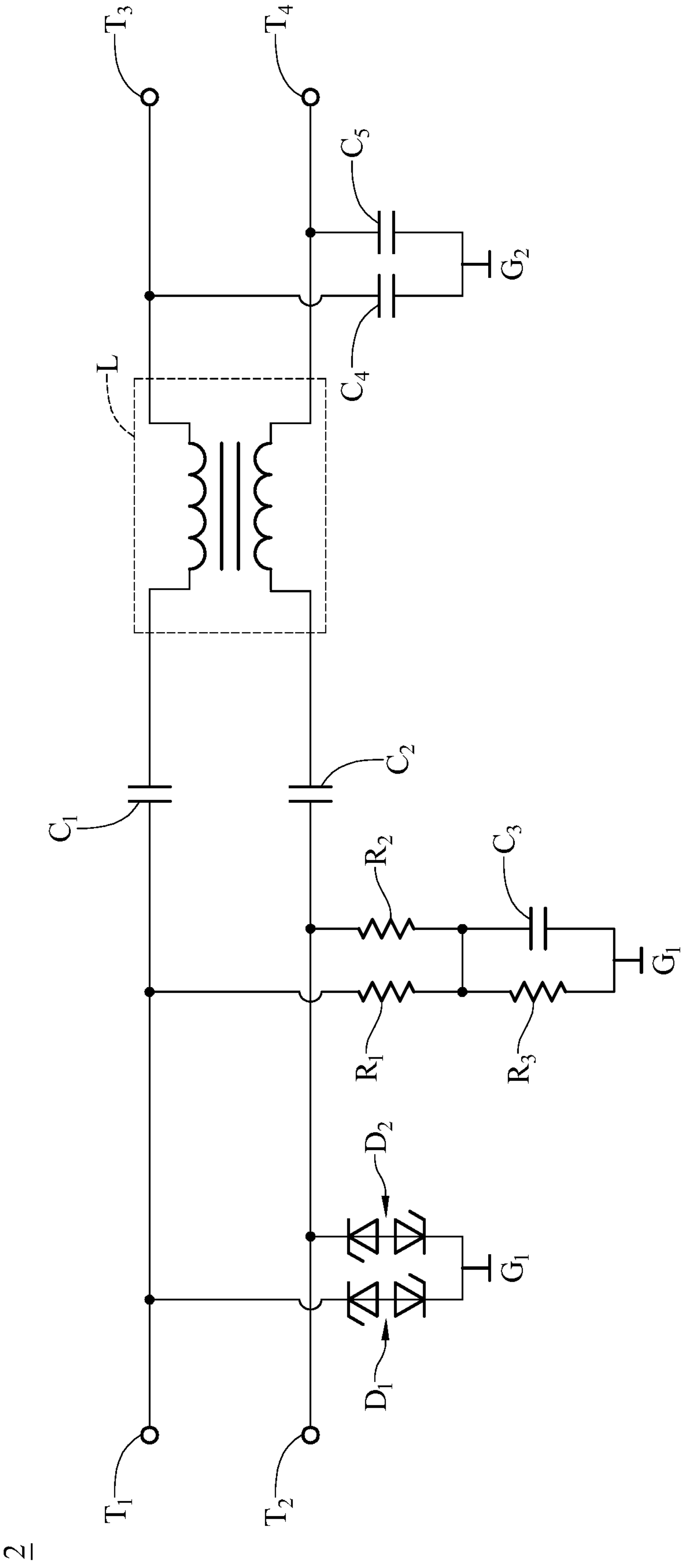
FIG. 2 is a circuit diagram illustrating an isolation transformer according to another embodiment of the present disclosure.

Please refer to FIG. 2 which is a circuit diagram illustrating an isolation transformer according to another embodiment of the present disclosure.

As shown in FIG. 2, an isolation transformer 2 according to another embodiment of the present disclosure includes a common mode choke L, a first capacitor $C_1$, a second capacitor $C_2$, a first resistor $R_1$, a second resistor $R_2$, a third resistor $R_3$, a third capacitor $C_3$, a first diode pair $D_1$, a second diode pair $D_2$, a fourth capacitor $C_4$ and a fifth capacitor $C_5$. The connection relationship of the common mode choke L, the first capacitor $C_1$, the second capacitor $C_2$, the first resistor $R_1$, the second resistor $R_2$, the third resistor $R_3$, the third capacitor $C_3$, the terminal $T_1$, the terminal $T_2$, the terminal $T_3$, the terminal $T_4$ is the same as that of the isolation transformer 1 shown in FIG. 1, and it is not repeated herein. The first diode pair $D_1$ is electrically connected the first capacitor $C_1$ through an end, and is connected to a first reference potential point $G_1$ through another end. The second diode pair $D_2$ is electrically connected the second capacitor $C_2$ through an end, and is connected to the first reference potential point $G_1$ through another end. The fourth capacitor $C_4$ is electrically connected the common mode choke L through an end, and is connected to a second reference potential point $G_2$ through another end. The fifth capacitor $C^5$ is electrically connected the common mode choke L, and is connected to the second reference potential point $G_2$ through another end. The first diode pair $D_1$ and the second diode pair $D_2$ constitute an electrostatic discharge protection circuit, and the fourth capacitor $C_4$ and the fifth capacitor $C^5$ constitute a filtering circuit. Specifically, the first reference potential point $G_1$ may be a ground terminal for the automotive Ethernet and the second reference potential point $G_2$ may be a common ground terminal for general circuits. Furthermore, the first reference potential point $G_1$ and the second reference potential point $G_2$ may be isolated from each other to avoid mutual interference. Additionally, the electrostatic discharge protection circuit, which includes the first diode pair $D_1$ and the second diode pair $D_2$, and the filtering circuit, which includes the fourth capacitor $C_4$ and the fifth capacitor $C^5$, are both optionally disposed, and may be added or omitted based on the actual requirement.

In an implementation of the electrostatic discharge protection circuit mentioned above, each of the first diode pair $D_1$ and the second diode pair $D_2$ has two diodes reversely connected to each other, and the electrostatic discharge protection level of the first diode pair $D_1$ and the second diode pair $D_2$ may be greater than 6000 volt. Additionally, in an embodiment of the filtering circuit mentioned above, the capacitance of each of the fourth capacitor $C_4$ and the fifth capacitor $C_5$ may be 100 picofarad.

In view of the above description, the isolation transformer of the present disclosure may realize high speed data transmission with less transmission cables.

What is claimed is:

1. An isolation transformer, applicable to automotive Ethernet, comprising:

a common mode choke;

a first capacitor electrically connected to the common mode choke through an end;

a second capacitor electrically connected to the common mode choke through an end;

a first resistor electrically connected to another end of the first capacitor through an end;

a second resistor electrically connected to another end of the second capacitor through an end;

a third resistor electrically connected to another end of the first resistor and another end of the second resistor through an end, and connected to a reference potential point through another end; and a third capacitor electrically connected to said another end of the first resistor and said another end of the second resistor through an end, and connected to the reference potential point through another end;

wherein a power consumption of each of the first resistor and the second resistor is greater than 0.4 watt, and wherein a capacitance of the third capacitor is 4.7 nanofarad.

2. The isolation transformer of claim 1, wherein a capacitance of each of the first capacitor and the second capacitor is 100 nanofarad.

3. The isolation transformer of claim 1, wherein a resistance of each of the first resistor and the second resistor is 1000 ohm.

4. The isolation transformer of claim 1, wherein a resistance of the third resistor is 100000 ohm.

5. The isolation transformer of claim 1, further comprising:

a first diode pair electrically connected to the first capacitor through an end, and connected to the reference potential point through another end; and a second diode pair electrically connected to the second capacitor through an end, and connected to the reference potential point through another end.

6. The isolation transformer of claim 5, wherein each of the first diode pair and the second diode pair has two diodes reversely connected to each other.

7. The isolation transformer of claim 5, wherein an electrostatic discharge protection level of the first diode pair and the second diode pair is greater than 6000 volt.

8. The isolation transformer of claim 1, further comprising:

a fourth capacitor electrically connected to the common mode choke through an end, and connected to another reference potential point through another end; and a fifth capacitor electrically connected to the common mode choke through an end, and connected to said another reference potential point through another end.

9. The isolation transformer of claim 8, wherein a capacitance of each of the fourth capacitor and the fifth capacitor is 100 picofarad.

* * * * *